(12) United States Patent
Ng et al.

(10) Patent No.: US 6,590,739 B2
(45) Date of Patent: Jul. 8, 2003

(54) DISC CLAMP WITH SHAPE MEMORY ALLOYS

(75) Inventors: Quock Ying Ng, Singapore (SG); Xiong Liu, Singapore (SG); Choonkiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/860,218

(22) Filed: May 19, 2001

(65) Prior Publication Data

US 2001/0053041 A1 Dec. 20, 2001

Related U.S. Application Data

(60) Provisional application No. 60/212,218, filed on Jun. 16, 2000.

(51) Int. Cl.$^7$ .......................... G11B 19/20; G11B 21/02
(52) U.S. Cl. ................................................ 360/98.08
(58) Field of Search .......................... 360/132, 99.12, 360/98.08, 99.05; 29/603.3, 447

(56) References Cited

U.S. PATENT DOCUMENTS

| | | | |
|---|---|---|---|
| 5,062,018 A | * 10/1991 | Yaeger | 360/244.6 |
| 5,101,306 A | * 3/1992 | Johnson | 360/98.08 |
| 5,199,139 A | 4/1993 | Hutchinson | |
| 5,277,435 A | * 1/1994 | Kramer et al. | 29/447 |
| 5,548,457 A | 8/1996 | Brooks et al. | |
| 5,724,718 A | 3/1998 | Moir et al. | |
| 5,940,244 A | 8/1999 | Canlas et al. | |
| 5,973,879 A | 10/1999 | Raffetto et al. | |
| 6,055,123 A | 4/2000 | Kazmierczak et al. | |

FOREIGN PATENT DOCUMENTS

| | | | |
|---|---|---|---|
| JP | 62-209764 | * 9/1987 | G11B/17/028 |
| JP | 09-106622 | * 4/1997 | G11B/19/20 |

OTHER PUBLICATIONS

Braunovic et al. "Shape Memory Alloy Mechanical Contact Devices." Sep. 1996. IEEE Transactions on Components, Packaging, and Manufacturing Technology. Part A. vol. 19.No. 3. pp. 295–303.*
Tini Aerospace, Inc. 1555 Doolittle Drive, San Leandro, CA 94577. "Shape Memory Alloys." Web page: www.tiniaerospace.com.*
Tom Borden, "Shape Memory Alloy Fastener Rings," Raychem Corporation. Menlo Park, CA, (May 11, 1990).
Brocca et al., "Three Dimensional Constitutive Model for Shape Memory Alloys based on Microplane Model," J. Mech. Phys. Solids, (Sep. 8, 2000).

* cited by examiner

Primary Examiner—David L. Ometz
Assistant Examiner—Christopher R Beacham
(74) Attorney, Agent, or Firm—Jennifer M. Buenz

(57) ABSTRACT

A disc clamp made from a shape memory alloy is configured for tight fit between an upper ledge of a spindle hub and the upper surface of a disc when the disc clamp is in an austenitic phase. In a martensitic phase, the disc clamp is configured for easy assembly over the spindle hub. The disc of the present invention provides for uniform distribution of clamping forces on the disc, and avoids the need for threaded holes in the spindle hub.

6 Claims, 3 Drawing Sheets

DISC CLAMP WITH SHAPE MEMORY ALLOYS

RELATED APPLICATIONS

The present application claims benefit of the U.S. provisional patent application No. 60/212,218, filed Jun. 16, 2000.

FIELD OF THE INVENTION

The present invention relates generally to disc drives. More particularly, the present invention relates to an improved disc clamp for use in securing a disc stack.

BACKGROUND OF THE INVENTION

In disc drives, data is recorded on and read from one or both surfaces of a disc. To increase storage capacity, more than one disc may be used. Data is stored in addressable units called sectors which are arranged in generally circular tracks defined on the disc surface. In operation, a read/write device, referred to as a head, is held over (or under, as the case may be) the appropriate track and the disc is rotated so that the head reads from or writes to a series of sectors along the same track. The head is supported by an actuator that is used for changing the position of the head relative to the tracks. The discs are thus mounted to the hub of a spindle motor for the required rotational motion, and are vertically spaced apart to allow for access by the heads. Typically, discs are alternately stacked with spacers on the spindle hub forming a disc stack that is secured to the spindle hub by a disc clamp. Slippage of the discs can, for example, result in track misregistration and read/write errors. Therefore it is desired of a disc clamp that it is able to keep the disc stack components in alignment even under high speed rotation and in the presence of large external shocks.

One disc clamp currently in use is in the form of a circular plate with three or more screw holes. It is placed over the top most disc of the disc stack and screws are passed through the screw holes to engage corresponding threaded holes on a top surface of the spindle hub. The need to allow for screw holes imposes a limit to how small the disc clamp may be designed, which in turn means that the amount of disc surface that is covered by the disc clamp and not available for data storage cannot be further reduced.

An alternative type of disc clamps is described in the U.S. Pat. No. 5,548,457, issued on Aug. 20, 1996, to Brooks et al. and in the U.S. Pat. No. 5,940,244, issued on Aug. 17, 1999, to Canlas et al. Instead of using screws to produce a clamping force, a shrink-fit ring is used. The disc clamp is expanded by heating prior to being placed onto the spindle hub. When the disc clamp cools, clamping forces are exerted on the disc stack. Shrink-fit disc clamps typically require heating to a high temperature, and this contributes to higher assembly cost. The process appears to be irreversible and thus may not be suitable for re-work.

The present invention provides an improved disc clamp to meet the continuing need for better quality disc drives that can be manufactured at lower cost. Other advantages of the present invention over the prior art will be evident from the following description.

SUMMARY OF THE INVENTION

The present invention relates to an improved disc stack system for use in a disc drive, where the disc stack involves a novel disc clamp.

In accordance with one embodiment of the invention, there is provided an annular disc clamp located in a groove of a spindle hub, where the groove is defined by a ledge and a shoulder. The disc clamp is configured to fit between the ledge and a disc resting on the shoulder. The disc clamp is made from a shape memory alloy. The disc clamp is shaped such that, in an austenitic phase, it has a thickness that is greater than a clearance, where the clearance is the distance from the upper surface of the disc to the ledge. In a martensitic phase, the disc clamp has an inner diameter that is greater than the diameter of the ledge and, in an austenitic phase, it has an inner diameter that is less than the diameter of the ledge. Preferably, the disc stack includes an inclined surface configured for mating with an inclined surface of the disc clamp. Preferably, the disc clamp includes a convex portion to provide a line contact with the disc.

In an alternative embodiment, the disc clamp is located between the upper ledge of the spindle hub and the top-most disc of a multiple-disc disc stack.

These and various other features as well as advantages which characterize the present invention will be apparent upon reading of the following detailed description and review of the associated drawings.

DETAILED DESCRIPTION

Figure 1:
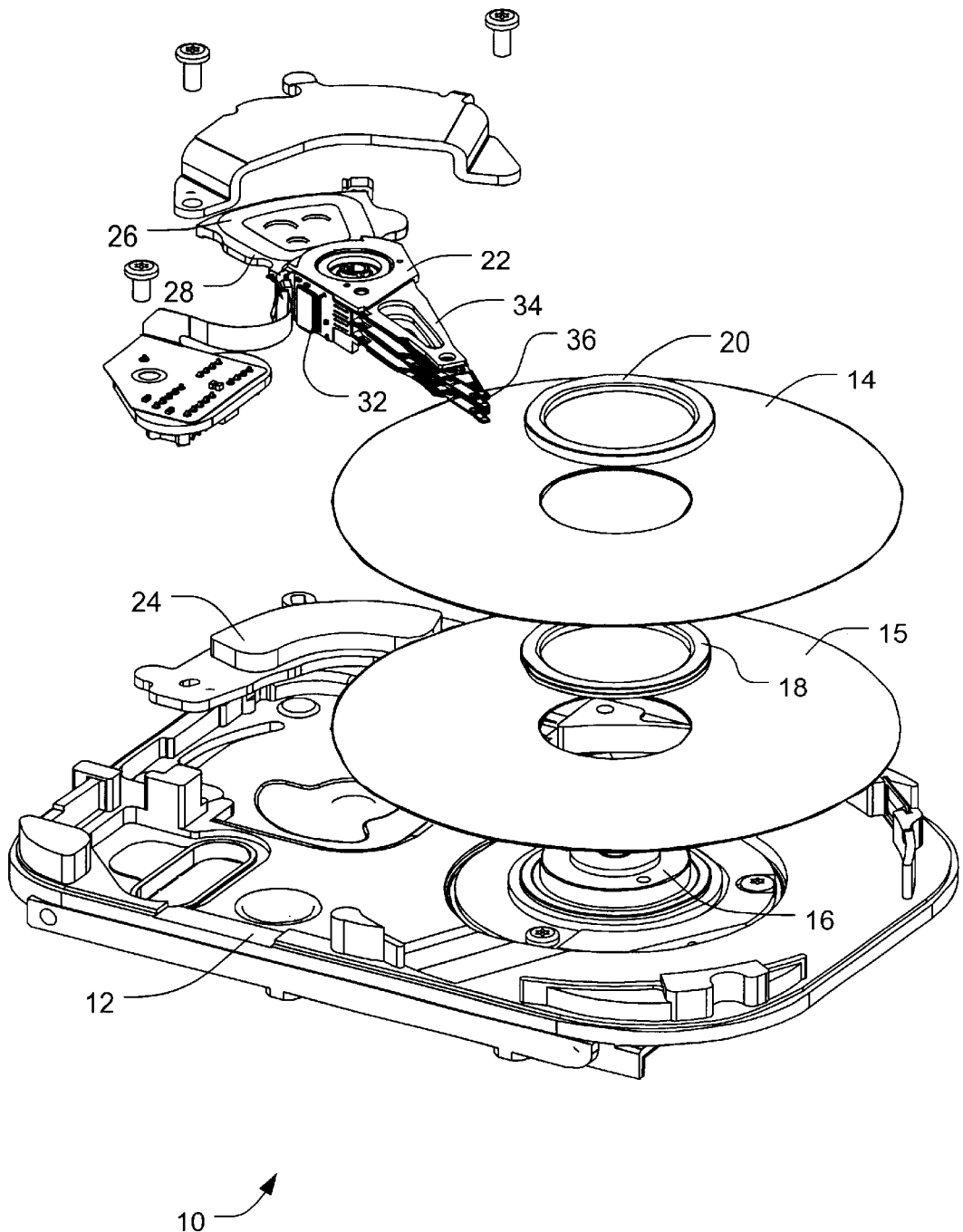
FIG. 1 shows an exploded view of a disc stack in a disc drive.

Preferred embodiments of the present invention are described below with the aid of the attached drawings. FIG. 1 shows a disc drive 10 in which the present invention is particularly useful. The disc drive includes a base 12 to which all other components are directly or indirectly mounted. Together with a cover (not shown), the base forms an enclosure which protects the components from external contamination.

The disc drive 10 includes one or more discs 14, 15 mounted for rotation on the hub of a spindle motor 16. In this example, the disc stack includes two discs separated by a spacer 18. Also shown is a disc clamp 20 of the present invention for securing the various components of the disc stack together. The surfaces of the discs are formatted for data storage. Each disc surface is divided into circular tracks of sectors, each sector being an addressable unit for data storage.

An actuator 22 is pivotably mounted to the base of the disc drive, and powered by a voice coil motor. The voice coil motor consists of a coil 26 supported within a magnetic field by a yoke 28 extending from the housing of the actuator. Electronic circuitry controlling the operation of the disc drive is provided on a printed circuit board assembly mounted to the outer surface of the base. Part of the electronic circuitry 32 is found within the disc drive enclosure, variously mounted to the actuator and the other components.

Extending from the actuator is a set of vertically spaced actuator arms 34 at the distal ends of which are supported heads 36 for writing data to and reading data from the disc. Data and control signals are carried between the electronic circuitry and the heads by a flexible printed circuit cable 38.

Figure 2:
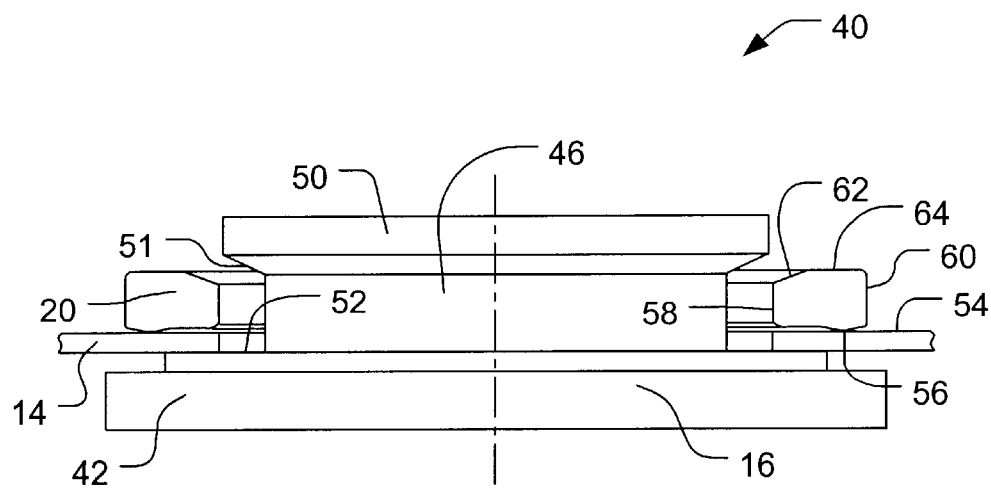
FIG. 2 is a cross-section of a disc stack according to a preferred embodiment of the present invention.

FIG. 2 is a cross-sectional view of a single-disc disc stack 40 with a disc clamp 20 according to a preferred embodiment of the present invention. The spindle motor 16 includes a base 42 that can be mounted to the base of the disc drive housing. The spindle hub supports a permanent magnet which interacts with an electromagnetic stator core to rotate the hub about the axis of the shaft. The hub 44 is shaped with a stem 46 that is configured with a groove 48, defined by a lower inclined surface 51 of a ledge 50 and a shoulder 52. An annular disc 14 is placed on the shoulder 52, and the disc clamp 20, to be described in greater detail below, is placed over the disc.

The disc clamp 20 is formed from a shape memory alloy (SMA). Shape memory alloys exhibit a shape memory effect as a result of their ability to transform between martensitic and austenitic phases. The transformation may be caused by the application of heat. For example, a SMA in the martensitic phase will begin to transform to the austenitic phase when heat is applied, as might be indicated by a temperature rise to greater than $A_s$, and the transformation will be complete when the temperature is greater than $A_f$. The reverse transformation will begin when heat is withdrawn from the SMA, as might be indicated by a temperature drop to less than $M_s$ and completed at temperature less than $M_f$. The temperatures $M_s$, $M_f$, $A_s$ and $A_f$ define the thermal transformation hysteresis loop of a SMA.

The disc clamp 20 is formed in a first configuration while in its austenitic phase. It is then cooled so that it transforms to the martensitic phase, and thereby undergoes deformation to a second configuration. The strain imparted to the disc clamp is recovered when the disc clamp is subsequently heated so that it transforms back to the austenitic phase, and accordingly regains its first configuration.

Various SMA are commercially available and a suitable choice may be made, as will be understood by a person skilled in the art. For example, relevant considerations may be based on the temperatures to which the disc clamp will be exposed before, during and after installation, and to the physical requirements placed on the disc clamp when in use. Other factors to consider may include the machinability and cost of the alloy. For example, a SMA consisting essentially of nickel, titanium and copper is known to display high strength, stability, and good workability and machinability, and may be selected for use in fabricating the disc clamp. Another example is a nickel-titanium alloy.

According to the preferred embodiment, the disc clamp 20 is annular with a uniform cross-section. When placed over the disc 14, a lower surface of the disc clamp is adjacent to an upper surface 54 of the disc. The lower surface of the disc clamp includes a convex ring 56 which comes into contact with the upper surface 54 of the disc 14. The ring 56 is concentric with the inner 58 and the outer circumference 60 of the disc clamp 20, and provides for a line contact with the disc 14. The inner circumference of the disc clamp includes a chamfer 62 where the inner surface 58 of the disc clamp meets the upper surface 64 of the disc clamp.

Figure 3:
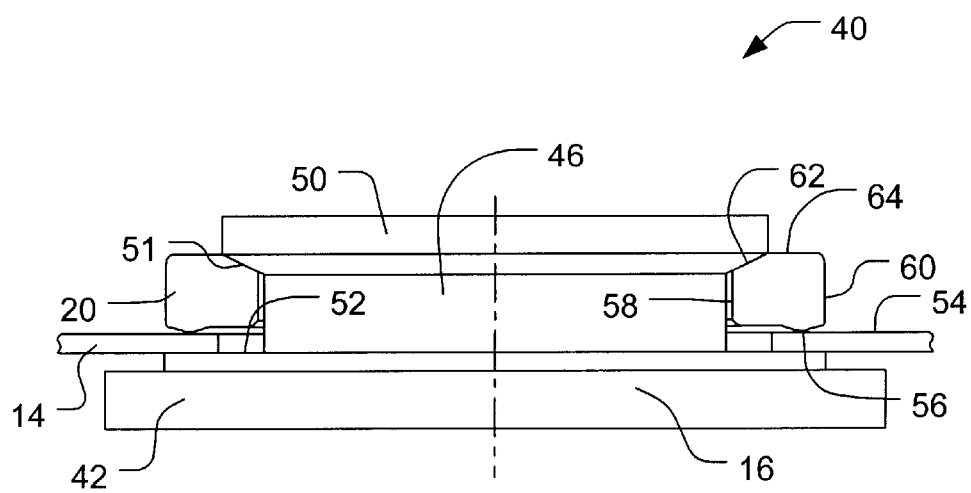
FIG. 3 is shows the disc stack of FIG. 2 after it is secured.

The disc clamp 20 is first fabricated in its austenitic phase with the inner diameter of the disc clamp wider than the stem 46 of the spindle hub, but smaller than the ledge 50 of the spindle hub. It is then cooled so that the SMA transforms to its martensitic phase. The disc clamp is thus caused to have an inner diameter wider than the ledge of the spindle hub, and can then be placed over the spindle hub to rest on the disc, as shown in FIG. 2. After the disc clamp is properly positioned, localized heat is applied to the disc clamp so that it undergoes a phase transformation back to its austenitic phase and reverts to its original shape. As the inner diameter of the disc clamp shrinks, the disc clamp 20 inserts itself into the groove 48 of the spindle hub. At the same time, axial expansion causes the chamfer 62 to slidably engage the inclined surface 51 of the ledge 50 of the spindle hub, as shown in FIG. 3. The original thickness of the disc clamp is designed to be slightly greater than the width of the groove, less the thickness of the disc, so that the resistance of the spindle hub to the axial expansion of the disc clamp provides the required clamping force.

In an alternative embodiment, the disc clamp may be reworked while in its martensitic phase which is characterized by relatively low yield strength, thus facilitating the assembly process.

It can be seen from the foregoing that the present invention allows the assembly time to be reduced since no screws are required. The fabrication of the disc clamp and of the spindle hub are also simplified since no threaded holes need to be made. In addition, it is found that there is less distortion of the disc because the clamping force is distributed uniformly on the disc.

Figure 4:
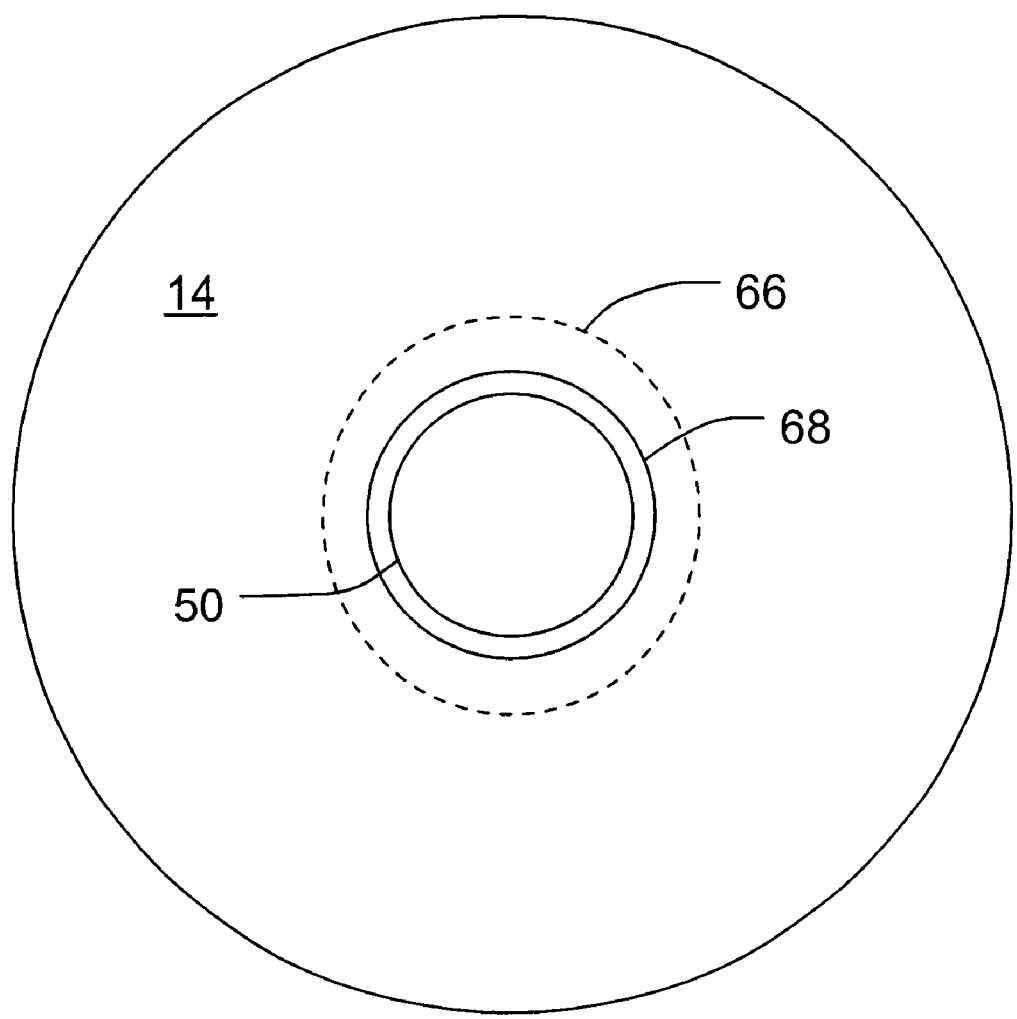
FIG. 4 is a top view of the disc stack of FIG. 3.

Compared to conventional disc clamps, a disc clamp of the present invention can provide the same clamping force although fabricated with a smaller outer diameter. In other words, the present invention provides an important advantage in that more disc surface can therefore be released for use in data storage. This is illustrated in FIG. 4 where the dashed line 66 indicates the usual size of a conventional disc clamp and the disc clamp of the present invention is shown in a solid line 68.

In an alternative embodiment, the disc stack may include a plurality of discs, interleaved with spacers, mounted on the spindle hub and secured together by a disc clamp of the present invention. In the case of a plurality of discs, the disc clamp 20 will be between the top-most disc 14 and the ledge 50 of the spindle hub. The original thickness of the disc clamp is fabricated to be slightly more than the clearance between the top-most disc and the ledge.

Alternatively, embodiments of the present invention may be described as follows:

A disc stack 40 for use in a disc drive 10 includes a plurality of discs 14 in a vertically interleaved arrangement with spacers 18, mounted on a spindle hub 44. The bottom-most disc 14 rests on a shoulder 52 of the spindle hub. The spindle hub 44 is configured with a groove 48 that is defined by the shoulder 52 and a ledge 50. In the groove 48 is an annular disc clamp 20 has a first surface 56 configured for abutment with the topmost disc 14 and a second surface 62 configured for abutment with the ledge 50. Preferably the disc clamp 20 is made from a shape memory alloy. The disc clamp 20 in an austenitic phase has a thickness that is greater than the clearance between the ledge 50 and the top-most disc 14. The disc clamp 20 in a martensitic phase has an inner diameter that is greater than the diameter of the ledge 50, and in an astenitic phase has an inner diameter that is less than the diameter of the ledge 50. The ledge 50 includes an inclined surface 51 configured for mating with the inclined second surface 62 of the disc clamp. The first surface 56 is a convex portion of a lower surface of the disc clamp such that the first surface 56 provides a line contact with the top-most disc 14. The present invention is also applicable to a disc stack 40 with only one disc 14.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts without departing from the scope and spirit of the present invention.

What is claimed is:

1. A disc stack for use in a disc drive, the disc stack comprising:
    a spindle hub comprising: a groove defined by a substantially straight stem extending between a ledge and a shoulder, where the ledge includes an inclined surface;
    an annular disc having an upper surface and a lower surface, the lower surface being in contact with the shoulder; and
    an annular disc clamp comprising:
        a first surface configured for abutment with the upper surface of the disc; and
        a second surface configured for abutment with the ledge such that the disc clamp and the disc are located in the groove and where the second surfaces inclined in order to mate with the ledge.

2. A disc stack of claim 1 wherein the disc clamp is made from a shape memory alloy that is reversibly deformable.

3. A disc stack of claim 2 wherein the disc clamp in an austenitic phase has a thickness that is greater than a clearance defined by the upper surface of the disc and the ledge.

4. A disc stack of claim 2 wherein the disc clamp in a martensitic phase has an inner diameter that is greater than the diameter of the ledge.

5. A disc stack of claim 2 wherein the disc clamp in an austenitic phase has an inner diameter that is less than the diameter of the ledge.

6. A disc stack of claim 5 wherein the first surface is a convex portion of a lower surface of the disc clamp such that the first surface provides a line contact with the disc.

* * * * *